(12) United States Patent
Merkel et al.

(10) Patent No.: US 7,055,208 B2
(45) Date of Patent: Jun. 6, 2006

(54) JOINT PART FOR A WINDSHIELD WIPER

(75) Inventors: Wilfired Merkel, Kappelrodeck (DE); Roger Daenen, Vlytingen-Riemst (BE)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 10/018,651

(22) PCT Filed: Mar. 20, 2001

(86) PCT No.: PCT/DE01/01054

§ 371 (c)(1),
(2), (4) Date: Mar. 1, 2002

(87) PCT Pub. No.: WO01/81135

PCT Pub. Date: Nov. 1, 2001

(65) Prior Publication Data

Related U.S. Application Data

(63) Continuation-in-part of application No. 09/284,399, filed as application No. PCT/DE98/02251 on Aug. 5, 1998, now Pat. No. 6,505,377.

(30) Foreign Application Priority Data

Aug. 14, 1997 (DE) ................................. 197 35 301
Apr. 22, 2000 (DE) ................................. 100 20 004

(51) Int. Cl.
*B60S 1/34* (2006.01)
(52) U.S. Cl. .............................. 15/250.351; 15/250.31
(58) Field of Classification Search .......... 15/250.351, 15/250.352, 250.202, 250.31, 250.21, 250.23
See application file for complete search history.

(56) References Cited

U.S. PATENT DOCUMENTS 3,427,675 A * 2/1969 Tibbet .................... 15/250.04
6,327,739 B1 * 12/2001 Kotlarski ............... 15/250.351

FOREIGN PATENT DOCUMENTS

| DE | 3829466 | * | 3/1990 | ............ 15/250.351 |
| DE | 693 05 442 T2 | | 2/1997 | |
| DE | 197 35 301 A1 | | 2/1999 | |
| EP | 0 579 550 A | | 1/1994 | |
| FR | 2 724 897 A | | 3/1996 | |
| GB | 838419 | * | 6/1960 | |
| JP | 6-127338 | * | 5/1994 | ............ 15/250.351 |

\* cited by examiner

*Primary Examiner*—Gary K. Graham
(74) *Attorney, Agent, or Firm*—Michael J. Striker

(57) ABSTRACT

The invention is based on a link element (10) for windshield wipers, which is adjoined by a wiper rod (28) and is manufactured out of a metal sheet (16) by means of stamping and bending, in which, starting from a longitudinally aligned covering wall (40), at least one wall part of a side wall (38, 42) is comprised of a number of sheet metal layers produced by being bent inward by 180°, and a hanging device (32, 52, 54; 60; 58, 64) for a tension spring is fastened to the innermost sheet metal layer and protrudes into a free space (30) between the side walls (38, 40).

The invention proposes that a slot (52) lateral to the longitudinal direction (56) of the link element (10) be let into the innermost sheet metal layer from the bottom edge (50) and that a pin (54) be inserted into this slot.

10 Claims, 3 Drawing Sheets

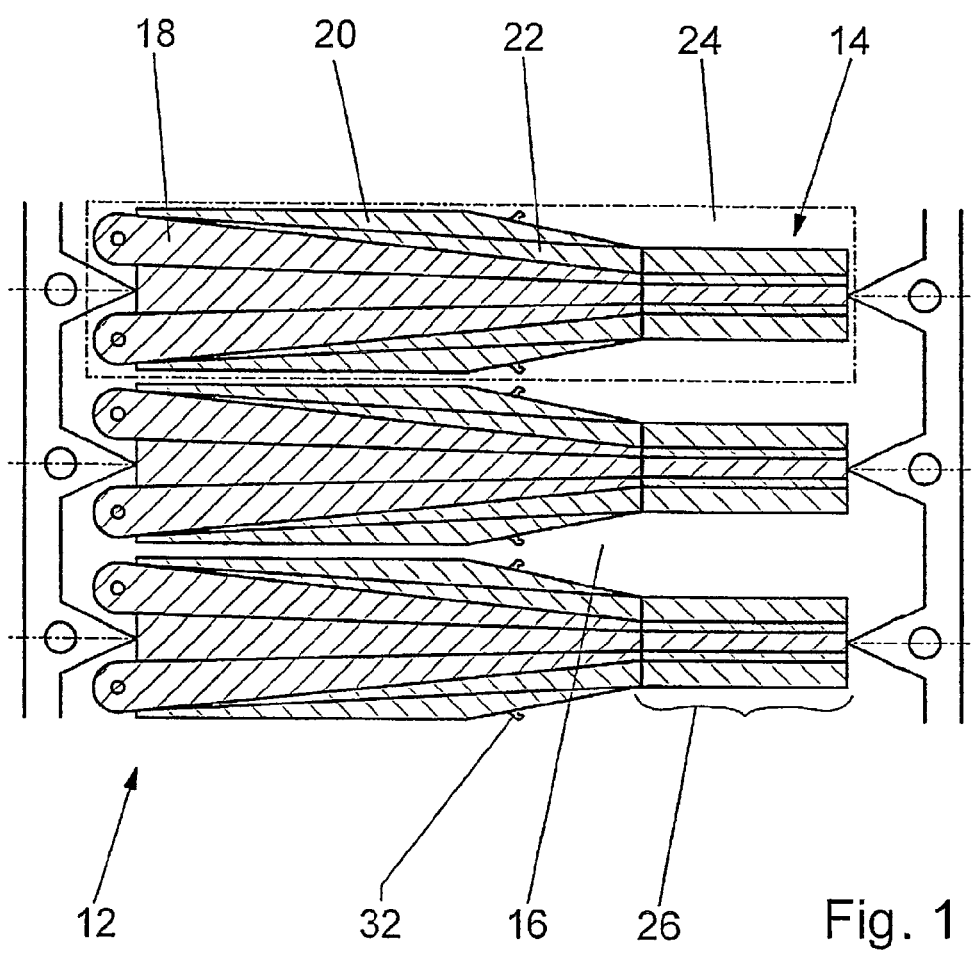

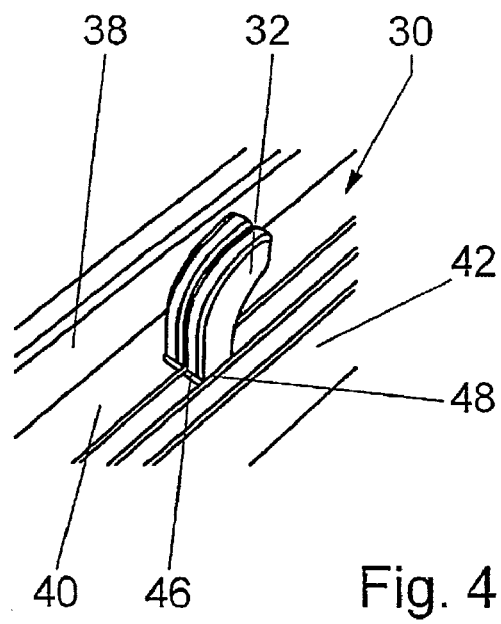
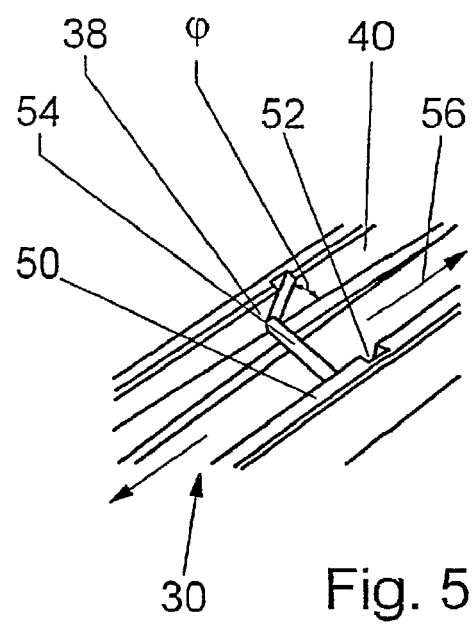
Fig. 4
Fig. 5
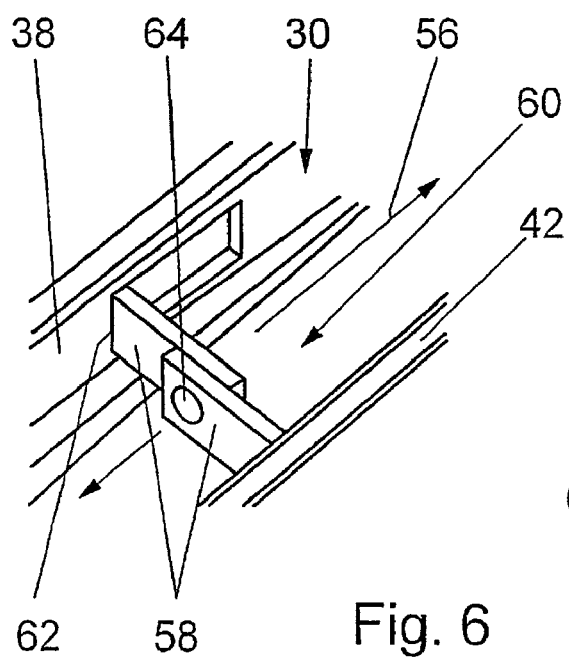
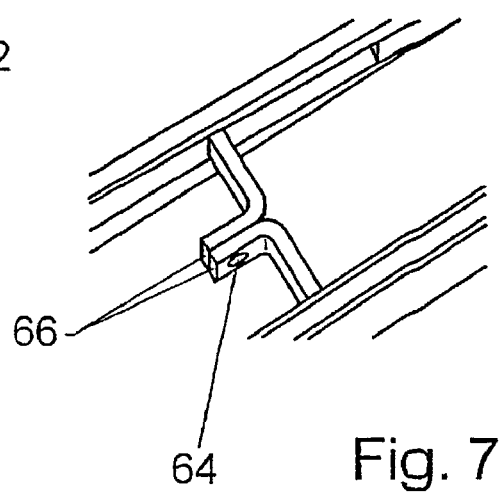
Fig. 6
Fig. 7

JOINT PART FOR A WINDSHIELD WIPER

CROSS-REFERENCE TO A RELATED APPLICATION

This patent application is a continuation-in-part of the patent application Ser. No. 09/284,399 filed on Jun. 1, 1999, now U.S. Pat. No. 6,505,377 issued on Jan. 14, 2003, which is a 371 of PCT/DE98/02251, filed Aug. 5, 1998.

BACKGROUND OF THE INVENTION

The invention is based on a link element for windshield wipers.

Conventional windshield wipers have a wiper arm which is comprised of a driven fastening part, a link element that is connected to it via a hinge joint, and a wiper rod rigidly adjoining the link element. The windshield wiper also has a wiper blade, which is coupled to the wiper rod and is comprised of a support bracket system and a wiper strip secured by it. The hook-shaped end of the wiper rod engages between two side walls of the support bracket system and includes a pivot bolt. The link thus produced guides the wiper blade with the wiper strip across a vehicle window; the link element and the support bracket system make it possible for the wiper strip to adapt to a curvature of the vehicle window. A required pressure of the wiper strip is achieved by means of at least one tension spring which secures the fastening part, along with the link element, to the wiper rod by means of the hinge joint. As a rule, the tension spring is suspended with a hook-shaped end on a lateral pin on the fastening part and is suspended with the other, likewise hook-shaped end on a hanging device on the link element.

The form of the individual components of the wiper arm is influenced by different requirements and stresses. They should be embodied to be as torsionally rigid, flectionally resistant, and narrow in the field of view as possible so that the wiper blade is guided in a vibration-free and controlled fashion across the vehicle window and thereby causes little interference in the field of view. Known windshield wipers therefore have a relatively wide fastening part and a link element formed out of sheet metal, which as a rule, has a U-shaped profile that opens toward the vehicle window. Its favorable resistance moment makes it particularly torsionally rigid and it can contain the tension spring so that the spring is hidden. The link element tapers toward its connecting point with the wiper rod so that it is embodied as narrow in the field of view.

The material stresses in the wiper arm depend on various factors such as driving forces and pressing forces, their engagement points and lever arms, as well as the resistance moment of the wiper arm. Since the optimal shape not only has to be matched to the stress progressions and the deflections, but also has to take other considerations into account, such as sufficient space for the tension spring, the flow resistance in the relative wind, and in particular an impairment to visibility during wiper operation, compromises often must be made.

DE 197 35 301 A1 has disclosed a wiper arm in which sheet metal parts, e.g. the fastening part and in particular, the link element with a wiper rod formed onto it, can be folded together with various numbers of sheet metal layers on top of each other in different regions, until the material thickness required for the respective cross section is achieved. In this connection, the material can be folded over by approx. 180° once or more times or remote surface regions can be placed against one another in one or preferably more steps in order to mutually support one another. Consequently, a relatively thin metal sheet can be used to produce different regions with various material thicknesses that can be adapted to the various loads. According to the prior art, the sheet metal parts are made up of flat metal sheets. They have contour surfaces and folding surfaces. The contour surfaces are used for the basic shaping of the sheet metal part and the folding surfaces are used for fastening regions and for producing various material thicknesses.

The still flat sheet metal part for a link element is cut from a metal sheet by means of a cutting or stamping process. According to this manufacturing process, a number of link elements are disposed next to one another so that a rectangle containing the outer contour of the flat sheet metal part meets the material requirements for a link element. Depending on the embodiment of the sheet metal part, various amounts of waste are generated, because even when fold engineering is used, as a rule the flat sheet metal part tapers from the linking point with the fastening part to the free end of the wiper rod in accordance with the decreasing material stress.

The known wiper arm has a hanging device for a tension spring on the link element. This hanging device is comprised of two opposing extensions of folding surfaces pointing toward the linking end, which have holes at their ends and are bent at right angles into a central plane in the intermediary space between the side walls so that the holes congruently overlap.

DE 693 05 442 T2 has disclosed a one-layer, sheet metal linking lever for a wiper arm. Other variants for hanging elements are proposed, which have additional connecting parts embodied in the form of plates or pegs. The additional connecting parts are welded or riveted to the lateral folding surfaces of the link element, or are folded inward to form shoulders. In this embodiment, although no additional waste is generated, it results in a considerable increase in the overall manufacturing costs of the windshield wiper due to an increased number of components. In addition, it is optically unfavorable because the ends of the insertion peg for the spring do not protrude far enough into the inner space between the side walls of the U-shaped profile and therefore are visible from the outside.

SUMMARY OF THE INVENTION

According to the invention, a slot lateral to the longitudinal axis is let in from the bottom edge into the innermost sheet metal layers of the side walls of a U-shaped link element produced by means of fold engineering and a pin that serves as a hanging device for the tension spring is inserted into this slot. The pin is inserted into the slot from the bottom edge and as a result of its reach, extends relatively far into the inner space of the U-shaped profile, where it is held between the outer sheet metal layers of the side walls, e.g. by being press-fitted into a recess and/or engaged in it in detent fashion. It is also possible that it is secured in an end position by the tension spring when the slot and the covering wall enclose an angle whose vertex points toward the hinge joint. The tension spring, which is suspended on the pin and whose other end is fastened to a lateral strut on the fastening part, secures the link element and the fastening part by means of a common rotation axis constituted by a pivot bolt on the fastening part.

A wiper rod is formed onto one end of the link element and the linking end for the fastening part is disposed at the other end. The pin for the tension spring is disposed approximately in the center of the link element. The suspended tension spring extends from here toward the linking end and thus advantageously in the lower region of the link element so that it is hidden by the side walls of the U-shaped profile and is not visible from the outside. In addition, the spring is easy to install in the pin hanger, which reduces manufacturing costs.

One embodiment of the invention provides that except for a short side, an elongated piece is respectively cut out from the innermost sheet metal layer of each of the side walls in the longitudinal direction and is perforated at its free end; these pieces are bent inward by approx. 90° and their ends overlap so that the holes coincide. The cut out pieces thus constitute a lateral strut on which the tension spring can be suspended. In this regard, it is advantageous that the lateral strut does not have to be installed and attached as an additional component, but rather, parts of the side walls are used as a hanging device for the tension spring, without reducing the stability of the link element. According to the invention, the cut out pieces of the side walls mutually support one another in the center region by virtue of the fact that they overlap and are consequently reinforced at the force engagement point. In addition to a favorable stability, this embodiment of the invention significantly reduces the manufacturing costs because it completely eliminates the installation work required for a lateral strut.

In a variant of the above-described embodiment of the invention, the overlapping ends of the cut out pieces are angled toward the link. As a result, the hook-shaped end of the tension spring can be suspended rotated by 90° so that a spacing, which is required according to the other variant, situated between the covering wall of the U-shaped profile and the lateral strut for the hook of the spring can be eliminated and the whole spring can be disposed deeper into the free space of the U-shaped link element.

The flat sheet metal part, from which the link element with a wiper rod formed onto it is produced by means of fold engineering, has an outer contour which extends from the linking end to the wiper rod end. In the center region, the height of the covering wall and the height of the side walls decrease toward the wiper rod and the contour of the stamped blank is tapered sharply. According to another embodiment of the invention, hook-shaped parts are formed onto the innermost sheet metal layers in this region and are cut or stamped from a metal sheet at the same time as the outer contour of the flat sheet metal part. After the folding, the innermost sheet metal layers of the flat blank of sheet metal extend parallel to the covering wall of the U-shaped profile and the formed, hook-shaped parts extend parallel to the side surfaces. A double-walled hook produced in this manner protrudes into the free space of the completed the U-shaped profile and its end points toward the wiper rod.

One end of the tension spring is simply fastened to this hook during the assembly of the windshield wiper. As a result, according to this embodiment of the invention, the simplified installation reduces manufacturing costs and, through a better use of the sheet metal material, also reduces the amount of waste generated per link element. In addition, favorable strength properties are achieved that are similar to those achieved in the embodiment that uses a hanging pin since the force engagement point of the tension spring on the hook is situated very close to the connection with the inner sheet metal layer of the link element and therefore, the hook is subjected not to a bending load, but chiefly to a shearing load. Furthermore, the latter embodiment eliminates additional components, which also reduces manufacturing costs.

DRAWINGS

Other advantages ensue from the following description of the drawings. Exemplary embodiments of the invention are shown in the drawings. The drawings, the specification, and the claims contain numerous features in combination. The specialist will also suitably consider the features individually and will unite them in other logical combinations.

BRIEF DESCRIPTION OF THE DRAWINGS

FIG. 1 shows stamping cut-outs of flat sheet metal parts for link elements arranged on a metal sheet, FIG. 4 shows an enlarged detail of a hanging device for a tension spring, and FIGS. 5–7 show variants of FIG. 4.

DESCRIPTION OF THE PREFERRED EMBODIMENTS

Figures 2, 3:
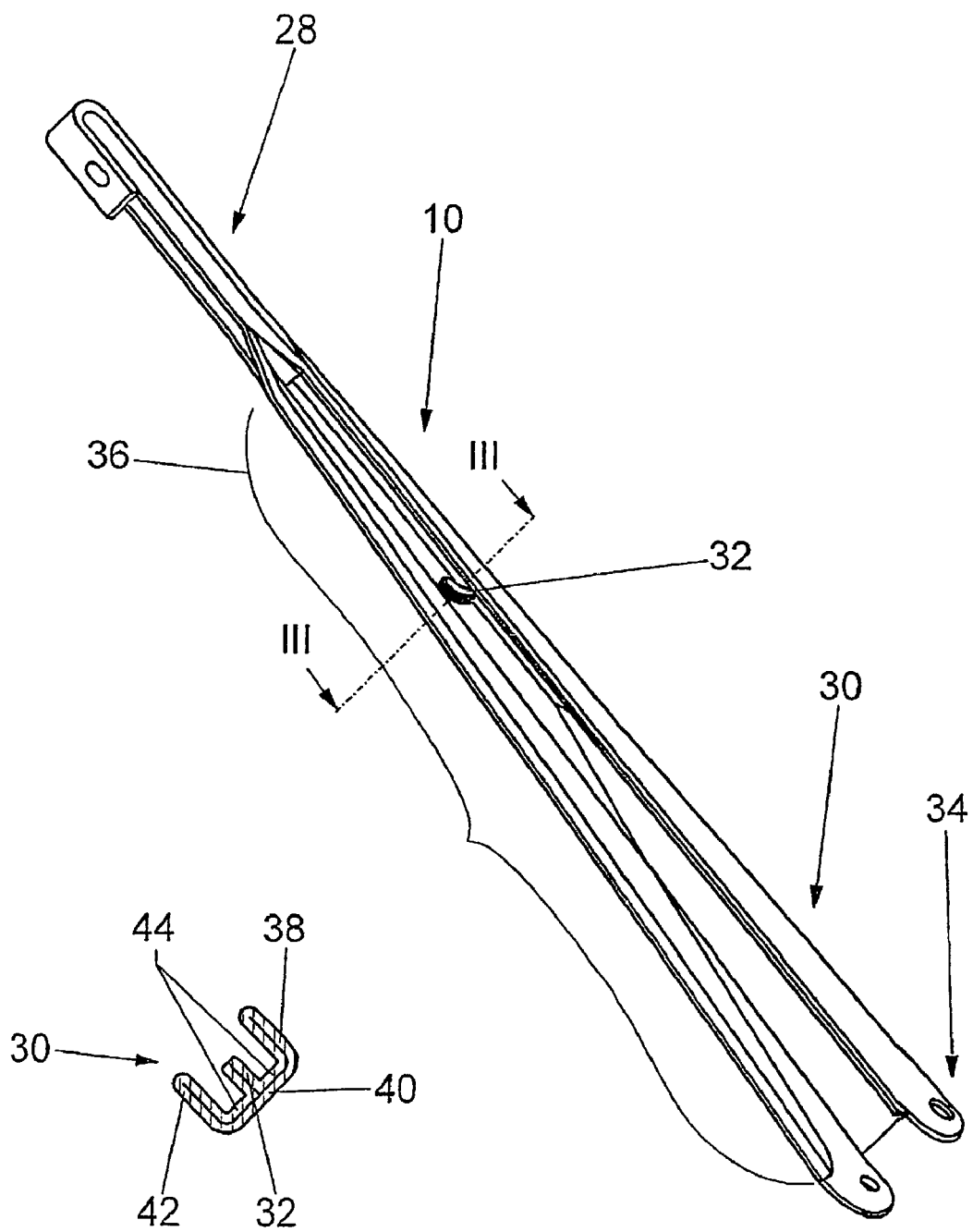
FIG. 2 is a bottom view of a link element with a wiper rod formed onto it.
FIG. 3 shows a section along a line III—III in FIG. 2.

FIG. 1 shows a stamped cutout 12 with sheet metal parts 14 that are still flat, that are stamped or cut from a metal sheet 16. A sheet metal part 14 has a contour surface 18 with symmetrically adjoining folding surfaces 20 and 22. The folding surfaces 20 and 22 are disposed in a rectangle 24, which is predetermined by the contour surface 18 and is almost completely filled up by the surfaces 18, 20, 22, as a result of which a number of sheet metal parts 14 can be favorably disposed next to one another during manufacture without generating large quantities of waste.

Later, in one or more work cycles, a link element 10 can be formed out of the contour surface 18 and the folding surfaces 20, 22 by means of bending, where the contour surface 18 essentially constitutes the outer contour after the bending or folding process. The folding surfaces 20, 22 are used to produce greater wall thicknesses in particular regions off the link element 10 by means of several sheet metal layers by being folded over by 180° or folded together, for example once or a number of times. Thus, for example, the region 26 is folded together to produce a wiper rod 28 that is later formed onto the link element 10.

According to the invention, a hanging device in the form of a bent hook 32 is produced from the material wasted in the stamping or cutting process. This hook is formed onto the innermost sheet metal layer of the folding surfaces 20, 22, inside the rectangle 24, in the sharply tapered center region, and is stamped or cut out from the metal sheet 16 at the same time as the sheet metal part 14. FIG. 2 shows a link element 10 that has been folded from the sheet metal part 14 and has a hook 32 formed onto it approximately in the center. In addition, the link element 10 has a wiper rod 28 formed onto one end, and at the other end, has a linking end 34 which is part of a hinge joint, not shown here, that connects to a fastening part that is likewise not shown.

In region 36, the link element 10 has a U-shaped profile, whose free space 30, when a wiper arm that is not shown here is completely installed, contains a tension spring which secures the link element 10 to the fastening part by means of the hinge joint. The tension spring, likewise not shown, is suspended on the hook 32. According to the invention, the hook 32 is formed onto the innermost sheet metal layer of the folding surface 20, 22 and is folded according to fold engineering so that the free end of the hook points toward the wiper rod 28. The tension spring suspended on the hook 32 is favorably disposed in the lower, wider part of the region 36 and cannot be seen from the outside.

The U-shaped profile of the region 36 that is folded from sheet metal part 14 and the hook 32 are shown in the sectional representation in FIG. 3. The covering wall 40, the side walls 38, 42 of the U-shaped profile, and the hook 32 disposed in the free space 30 are advantageously comprised of one sheet metal part, which is partially folded into a number of overlapping layers of sheet metal in order to achieve a greater strength. The innermost sheet metal layers of each of the side walls 38, 42 are respectively adjoined by an inner wall 44 and when bent into place, these inner walls extend parallel to the covering wall 40 and have congruent hooks 32 formed onto their edges oriented toward one another. These hooks are bent by 90° into the free space 30 of the U-shaped profile.

FIG. 4 shows the U-shaped profile of the link element 10 and the hook 32 from another perspective. A suspended tension spring loads the hook 32 at the connection to the inner wall 44. As a result, a rectangular surface formed from the sides 46, 48 is chiefly subjected to a shear stress at the connection.

The variant according to FIG. 5 shows a link element 10 in which a slot 52 lateral to the longitudinal direction 56 is let in from the bottom edge 50 into the innermost sheet metal layer and a pin 54 is inserted into this slot. According to the invention, the pin 54 constitutes the hanging device for a tension spring on the link element 10. In this connection, the pin 54 inserted into the slots 52 reaches very far into the free space 30 of the U-shaped profile. The slot 52 and the covering wall 40 enclose an acute angle φ whose vertex points toward the linking end 34 of the link element 10 so that the pin 54 is held in its end position by the diagonal course of the slot 52, where it is press-fitted and/or secured in detent fashion between the outer sheet metal layers of the side walls 38, 42. A suspended tension spring, whose force impingement line extends in the longitudinal direction 56 of the link element 10 to the linking end 34, also pulls the pin 54 into this position.

An embodiment according to FIG. 6 has short pieces 58, which are cut out from the innermost sheet metal layer of the link element 10, protrude into the free space 30 of the U-shaped profile, and serve as a hanging device for the tension spring. In this connection, except for a short side 62, the pieces 58 are essentially cut out from the innermost layers of the side walls 38, 42 chiefly in the longitudinal direction 56 and are bent inward by 90° in another work step. After the bending, the perforated ends of the pieces 58 overlap and form a lateral strut 60 for suspension of the tension spring. In addition, the lateral strut 60 is reinforced by the overlapping in the vicinity of the hole 64.

FIG. 7 shows a variant with perforated and angled ends 66, which point toward the linking end 34. In this connection, a tension spring can be suspended rotated by 90°.

| Reference Numerals | |
| --- | --- |
| 10 | link element |
| 12 | stamped cutout |
| 14 | sheet metal part |
| 16 | metal sheet |
| 18 | contour surface |
| 20 | folding surface |
| 22 | folding surface |
| 24 | rectangle |
| 26 | region |

| -continued | |
| --- | --- |
| Reference Numerals | |
| 28 | wiper rod |
| 30 | free space |
| 32 | hook |
| 34 | linking end |
| 36 | region |
| 38 | side wall |
| 40 | covering wall |
| 42 | side wall |
| 44 | inner wall |
| 46 | surface |
| 48 | surface |
| 50 | edge |
| 52 | slot |
| 54 | pin |
| 56 | longitudinal direction |
| 58 | piece |
| 60 | lateral strut |
| 62 | side |
| 64 | hole |
| 66 | end |

The invention claimed is:

1. A link element (10) for windshield wipers, which is adjoined by a wiper rod (28) and is manufactured out of a metal sheet (16) by means of stamping and bending, in which starting from a longitudinally aligned covering wall (40), at least one wall part of a side wall (38, 42) is comprised of a number of sheet metal layers produced by being bent inward by 180°, and a hanging device (32, 52, 54; 60; 58, 64) for a tension spring is fastened to the innermost sheet metal layer and protrudes into a free space (30) between side walls (38, 42), characterized in that a slot (52) lateral to the longitudinal direction (56) of the link element (10) is let into the innermost sheet metal layer from the bottom edge (50) and a pin (54) is inserted into this slot.

2. The link element (10) according to claim 1, wherein the slot (52) and the covering wall (40) enclose an acute angle (φ) whose vertex points toward the linking end (34).

3. The link element (10) according to one of the preceding claim 1, wherein the pin (54) is press-fitted and/or secured in detent fashion between the outer sheet metal layers of the side walls (38, 42).

4. The link element (10) according to claim 1, wherein the wiper rod (28) is formed onto it.

5. A link element (10) for windshield wipers, which is adjoined by a wiper rod (28) and is manufactured out of a metal sheet (16) by means of stamping and bending, in which starting from a longitudinally aligned covering wall (40), at least one wall part of a side wall (38, 42) is comprised of a number of sheet metal layers produced by being bent inward by 180°, and a hanging device (32, 62, 54; 60; 58, 64) for a tension spring is fastened to the innermost sheet metal layer and protrudes into a free space (30) between side walls (38, 42) expect for a short side (62), an elongated piece (58) is respectively cut out from each of the innermost sheet metal layers of the side walls (38, 42) in the longitudinal direction (56) and is perforated at its free end; these pieces are bent inward by approx. 90° and their ends overlap so that holes (64) coincide.

6. The link element (10) according to claim 5, wherein that the ends (66) are bent at right angles toward the linking end (34).

7. The link element (10) according to one of the preceding claims, wherein that a wiper rod (28) is formed onto it.

8. The link element according to claim 5, wherein the wiper rod (28) is formed onto it.

9. A link element (10) for windshield wipers, which is adjoined by a wiper rod (28) and is manufactured out of a metal sheet (16) by means of stamping and bending, in which starting from a longitudinally aligned covering wall (40), at least one wall part of a side wall (38, 42) is comprised of a number of sheet metal layers produced by being bent inward by 180°, and a hanging device (32, 62, 54; 60; 58, 64) for a tension spring is fastened to the innermost sheet metal layer and protrudes into a free space (30) between side walls (38, 42) the width of the covering wall (40) and the height of the side walls (38, 42) decrease toward the wiper rod (28) and the contour of stamped blanks made of sheet metal (14) favorably covers a rectangle (24) that has the maximal width and length of the blank, characterized in that the innermost sheet metal layers of each of the side walls (38, 42) are respectively adjoined by an inner wall (44) and when bent into place, these inner walls extend parallel to the covering wall (40) and have congruent hooks (32) formed onto their edges oriented toward one another; these hooks are bent by 90° into the free space (30) and their free ends point toward the wiper rod (28).

10. The link element according to claim 9, wherein the wiper rod (28) is formed onto it.

* * * * *